United States Patent Office 2,785,105
Patented Mar. 12, 1957

2,785,105

METHOD OF PREPARING HOG CHOLERA ANTIBODY CONCENTRATE

Roland J. Seidel, Des Plaines, and Milton J. West, Chicago, Ill., assignors to Armour and Company, Chicago, Ill., a corporation of Illinois No Drawing. Application January 27, 1954,
Serial No. 406,598

4 Claims. (Cl. 167—80)

This invention relates to a method of preparing a hog cholera antibody concentrate. The method of this invention is also applicable to the preparation of other antibody concentrates.

The present practice in preparing anti-hog cholera sera is to collect the blood of immune hogs after inoculation with cholera virus to obtain hyperimmune blood. The fibrin and cells are then separated to obtain a serum rich in hog cholera antibodies, which after pasteurization and the addition of a preservative, is bottled for administration as an anti-serum. This procedure presents a problem due to the variation in potency of the serum, and also because the antibodies in the anti-serum are not sufficiently concentrated.

It is therefore an object of this invention to provide a method of preparing hog cholera antibody concentrates of more uniform potency and greater concentration than the present commercial anti-sera. It is also an object of this invention to provide a method of general applicability for preparing antibody concentrates where the desired antibody is associated with the gamma globulin fraction of blood. Further objects and advantages will appear as the specification proceeds.

It is known in general that hog cholera antibodies and other antibodies are associated with the globulin fraction of blood, which fraction can be obtained by various methods from whole blood or blood serum without denaturation. For example, the globulin fraction of blood serum can be precipitated by adding ethyl alcohol to the serum to a concentration of about 25%. The precipitated globulin fraction can be fractionated into globulin subfractions such as gamma globulin and beta globulin. However, the presently known method for carrying out this fractionation presents difficulties in the preparation of antibody concentrates, especially where it is desired to pasteurize the antibody preparations. The globulin fraction of blood, after it has been separated from the serum, is relatively unstable to heat. Therefore, heating has generally been avoided in the further processing of a globulin fraction of blood, except as an adjunct to salting out procedures. What is desired in the case of preparing hog cholera antibody concentrates as well as other antibody concentrates is a simple one-step method for preparing a purified and substantially sterile subfraction of gamma globulin containing the desired antibodies. The present invention is believed to meet this need.

This invention is based in part on the discovery that when a globulin fraction containing hog cholera antibodies is dissolved in water and heated within a certain critical temperature range and within a critical pH range, that a selective coagulation of a subglobulin fraction can be brought about, thereby reducing the amount of globulin in solution, while at the same time retaining the cholera antibodies in solution. It has also been found that the coagulated globulins are largely classifiable as beta globulins in contradistinction to the class of gamma globulins. Therefore, it appears that the hog cholera antibodies tend to associate themselves principally with gamma globulins.

In practicing the method of this invention, any serum globulin fraction containing hog cholera antibodies and gamma and beta globulins can be used as a starting material. Some albumen can also be present. It will be understood, of course, that the serum globulins should be in their original undenatured water-soluble state.

The serum globulin fraction is dissolved in water, preferably in a concentration of 1 to 5%, although concentrations up to 10% can be used. The pH of the solution is then adjusted within the range from 4.8 to 6.0, and optimum results are obtained at pHs ranging from 5.0 to 5.4. Alternatively, the serum globulin can be dissolved in water previously acidified to the desired pH, but it is preferred to make the pH adjustment after the dissolving of the globulin fraction.

The prepared globulin solution is then heated at a temperature within the range from 40 to 65° C. to coagulate a portion of the globulins without precipitating the hog cholera antibodies. It will be understood, of course, that the exact time of heating will vary somewhat with the particular temperature selected, longer times being employed at lower temperatures, etc. By way of specific example, at a temperature of 58 to 59° C. a heating time of 2 to 3 hours is suitable to effect the selective coagulation of beta globulins while leaving the bulk of the gamma globulins and hog cholera antibodies in solution. Shorter heating periods can be used dependent upon the temperature, pH, etc.

While some salt can be present during the heat coagulation step, it is preferred to have the solution substantially free of salt. In other words, it is desired to carry out a selective heat coagulation of the proteins rather than a salting out. This selective coagulation is preferably carried out in the presence of a globulin-stabilizing agent such as glycine. However, only a small amount of the stabilizing agent will usually be required. For example, from a .01 to a .1 molar concentration of glycine is suitable.

The concentration of the antibodies in the solution can be varied by regulating the concentration of the globulin fraction in the water prior to the coagulation step. In this way it is possible to achieve much higher antibody concentrations in the solution than would be obtained in blood serum. The antibody concentrate prepared in this manner does not require further pasteurization, since the heating step also serves to pasteurize the concentrate. However, it will usually be desirable to add a preservative before bottling the concentrate, such as a .5% concentration of phenol. In other words, after the completion of the heat coagulation step, the coagulum is separated from the solution by centrifugation or filtration, a preservative is added to the separated solution, and the solution is bottled to provide the anti-serum product.

It will be apparent from the above discussion relating particularly to the preparation of a hog cholera antibody concentrate, that the method of this invention is applicable generally to the preparation of antibody concentrates from serum globulins where the desired antibody associates itself primarily with the gamma globulin fraction of blood.

The method of this invention is further illustrated by the following specific examples.

*Example I*

A 3.04% solution of serum globulin fraction (33% gamma globulin, 61% alpha and beta globulin, 6% albumin) containing hog cholera antibodies was adjusted to pH 5.2 with acetic acid. Glycine was added to a concentration of .04 M. The solution was heated to 58° C. for 2 and ½ hours. The coagulated serum proteins were removed by filtration.

Analysis of the filtrate by electrophoresis indicated the gamma globulin had been increased to 93% and the beta globulin had decreased to 7% and albumin equaled 0%. Total nitrogen analysis of the filtrate indicated a value of 1.54 mg. N/ml.

*Example II*

A 3.04% solution of serum globulin fraction (33% gamma globulin, 61% alpha and beta globulin, 6% albumin) containing hog cholera antibodies was adjusted to pH 5.6 with acetic acid. Glycine was added to a concentration of .04 M. The solution was heated to 58° C. for 2 and ½ hours. The coagulated serum proteins were removed by filtration.

Analysis of the filtrate by electrophoresis indicated the gamma globulin had been increased to 85% and the beta globulin had decreased to 7% and albumin equaled 6%. Total nitrogen analysis of the filtrate indicated a value of 1.50 mg. N/ml.

*Example III*

A 2.97% solution of serum globulin fraction (51% gamma globulin, 43% alpha and beta globulin, 6% albumin) containing hog cholera antibodies was adjusted to pH 5.2 with acetic acid. Glycine was added to a concentration of .04 M. The solution was heated to 59° C. for 2 and ½ hours. The coagulated serum proteins were removed by filtration.

Analysis of the filtrate by electrophoresis indicated the gamma globulin had been increased to 96% and the beta globulin had decreased to 4% and albumin equaled 0%. Total nitrogen analysis of the filtrate indicated a value of .76 mg. N/ml.

*Example IV*

A 3.04% solution of serum globulin fraction (33% gamma globulin, 61% alpha and beta globulin, 6% albumin) containing hog cholera antibodies was adjusted to pH 4.8 with acetic acid. Glycine was added to a concentration of .04 M. The solution was heated to 58° C. for 2 and ½ hours. The coagulated serum proteins were removed by filtration.

Total nitrogen analysis of the filtrate indicated a value of 0.54 mg. N/ml.

*Example V*

A 2.97% solution of serum globulin fraction (51% gamma globulin, 43% alpha and beta globulin, 6% albumin) containing hog cholera antibodies was adjusted to pH 5.2 with sodium acetate-acetic acid buffer. Glycine was added to a concentration of .04 M. The solution was heated to 59° C. for 2 and ½ hours. The coagulated serum proteins were removed by filtration.

Analysis of the filtrate by electrophoresis indicated the gamma globulin had been increased to 97% and the beta globulin had decreased to 3% and albumin equaled 0%. Total nitrogen analysis of the filtrate indicated a value of .60 mg. N/ml.

*Example VI*

A 2.97% solution of serum globulin fraction (51% gamma globulin, 43% alpha and beta globulin, 6% albumin) containing hog cholera antibodies was adjusted to pH 5.2 with acetic acid. The solution was heated to 58° C. for 3 hours. The coagulated serum proteins were removed by filtration.

Analysis of the filtrate by electrophoresis indicated the gamma globulin had been increased to 98% and the beta globulin had decreased to 2% and albumin equaled 0%. Total nitrogen analysis of the filtrate indicated a value of .92 mg. N/ml.

*Example VII*

A 7.0% solution of serum globulin fraction (33% gamma globulin, 61% alpha and beta globulin, 6% albumin) containing hog cholera antibodies was adjusted to a pH of 5.9 with acetic acid. Glycine was added to a concentration of .04 M. The solution was heated to 59° C. for 2 and ½ hours. The coagulated serum proteins were removed by filtration.

Analysis of the filtrate by electrophoresis indicated the gamma globulin to be 4%, the beta globulin 12%, and the albumin 64%. Total nitrogen of the filtrate indicated a value of 1.43 mg. N/ml.

The serum globulin fraction used in the above examples cited was prepared by the following method:

Hog serum was adjusted to a pH of 6.9 and ethanol concentration of 25%. The resultant precipitate, consisting primarily of beta and gamma globulins was centrifuged off. This globulin paste consists of approximately 25% solids and is the starting material for the serum globulin fraction mentioned in the examples. The globulin paste was diluted from approximately 25% solids to 3% solids then this 3% solution was adjusted in pH and heated to coagulate all the protein not containing the antibody.

While in the foregoing specification the method of this invention has been described in relation to a specific preferred embodiment thereof, it will be apparent to those skilled in the art that it is susceptible to other embodiments.

We claim:

1. The method of preparing a hog cholera antibody concentrate from a serum globulin fraction containing gamma globulins, beta globulins, and hog cholera antibodies, comprising dissolving said serum globulin fraction in water in a concentration of from 1 to 10%, adjusting the pH of the solution to within the range from 4.8 to 6.0, heating said solution at a temperature ranging from 40 to 65° C. until a coagulum has formed from a portion of the solids in said solution, and separating the coagulum from the supernatant solution, thereby enhancing the concentration of hog cholera antibodies in the supernatant solution relative to the serum globulins remaining therein.

2. The method of preparing a hog cholera antibody concentrate from a serum globulin fraction containing gamma globulins, beta globulins, and hog cholera antibodies, comprising dissolving said serum globulin fraction in water in a concentration of from 1 to 5%, adjusting the pH of the solution to within the range from 5.0 to 5.4, heating said solution at a temperature ranging from 45 to 60° C. until a coagulum has formed from a portion of the solids in said solution, and separating the coagulum from the supernatant solution, thereby enhancing the concentration of hog cholera antibodies in the supernatant solution relative to the serum globulin remaining therein.

3. The method of claim 2 in which said solution during said heating step also contains a .01 to .1 molar concentration of glycine.

4. The method of preparing an antibody concentrate from a serum globulin fraction containing gamma globulins, beta globulins, and hog cholera antibodies associated with said gamma globulins, comprising dissolving said serum globulin fraction in water to form a solution thereof, adjusting the pH of the solution to within the range from 5.0 to 5.4, heating said solution at a temperature ranging from 45 to 60° C. until a coagulum is formed from a portion of the solids in said solution, and separating the coagulum from the supernatant solution, thereby enhancing the concentration of antibodies in the supernatant solution relative to the serum globulins remaining therein.

(References on following page)

References Cited in the file of this patent

FOREIGN PATENTS 6,604     Great Britain ------------------- 1915

OTHER REFERENCES

Dorset et al.: J. Agr. Research, vol. VI, No. 9, pp. 333–338, May 29, 1916.

Kelser et al.: "Manual of Veterinary Bacteriology," pp. 712 and 713, pub. 1948 by the Williams & Wilkins Co., 1948, Baltimore, Md.

Tullis: "Blood Cells and Plasma Proteins, Their State in Nature," pub. by Academic Press Inc., N. Y. C., 1953, pp. 180–186, especially page 181.

Cohen et al.: J. A. C. S., vol. 72, 1950, pp. 465–474.